United States Patent
Honzelka et al.

(10) Patent No.: US 7,610,933 B2
(45) Date of Patent: Nov. 3, 2009

(54) TWO PART VALVE BODY FOR A WATER TREATMENT SYSTEM

(76) Inventors: Thomas Honzelka, 1605 Navajo St., Grafton, WI (US) 53024; Ken Sieth, 2730 Peninsula Dr., Delafield, WI (US) 53018

(*) Notice: Subject to any disclaimer, the term of this patent is extended or adjusted under 35 U.S.C. 154(b) by 284 days.

(21) Appl. No.: 11/349,758

(22) Filed: Feb. 8, 2006

(65) Prior Publication Data
US 2007/0181193 A1    Aug. 9, 2007

(51) Int. Cl.
*F16K 11/074* (2006.01)
*C02F 1/42* (2006.01)

(52) U.S. Cl. ............ 137/597; 137/315.39; 137/599.15; 251/262

(58) Field of Classification Search ............ 137/315.09, 137/315.39, 597, 599.11, 599.14, 599.15; 251/262, 263
See application file for complete search history.

(56) References Cited

U.S. PATENT DOCUMENTS 2,539,221 A    1/1951   Badeaux
3,475,006 A *  10/1969  Sargent ................. 251/285
3,797,523 A *  3/1974   Brane et al. ........... 137/599.15
3,867,961 A    2/1975   Rudelick
3,894,719 A    7/1975   Horvath
5,910,244 A    6/1999   Stamos et al.
6,206,042 B1   3/2001   Channell et al.
2003/0188999 A1  10/2003  Stocchiero et al.

* cited by examiner

*Primary Examiner*—Stephen Hepperle
*Assistant Examiner*—William McCalister
(74) *Attorney, Agent, or Firm*—Quarles & Brady LLP; George E. Haas

(57) ABSTRACT

Operation of a water softener is controlled by a set of valves within a body that has water inlet, water outlet, a regenerant connector and a drain outlet. Openings are provided in an exterior wall of the body through which a plurality of valve elements are received. The body has opposing exterior side walls through which a seam diagonally extends, thereby separating the body into two parts sealed together at that seam. The diagonal seam divides internal fluid chambers between each part and facilitates molding the parts so that the entire body can be fabricated by only two parts.

5 Claims, 3 Drawing Sheets

TWO PART VALVE BODY FOR A WATER TREATMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to apparatus for treating water, such as water softeners; and more particularly to a valve assembly for controlling the regeneration of the treatment medium in such apparatus.

2. Description of the Related Art

It is quite common for water drawn from a well to be considered "hard" in that the water contains di-positive and tri-positive ions which have leached from mineral deposits in the earth. Such ions form insoluble salts with common detergents and soaps producing precipitates that increase the quantity of detergent or soap required for cleaning purposes. When hard water is used in boilers and other equipment, evaporation results in the precipitation of insoluble residues that accumulate as scale and adversely affect the operation of that equipment.

It is standard practice to install a water softener in the plumbing system of a building that is supplied with hard water. The most common kind of water softener is an ion exchange apparatus that has a tank containing a resin bed through which the hard water flows to remove undesirable minerals and other impurities. Binding sites in the resin bed initially contain positive ions, commonly unipositive sodium or potassium ions. As hard water enters the bed, competition for the binding sites occurs. The di-positive and tri-positive ions in the hard water are favored due to their higher charge densities and displace the unipositive ions. Two or three unipositive ions are displaced for each di-positive or tri-positive ion, respectively.

The capacity of the resin bed to absorb minerals and impurities is finite and eventually ceases to soften the water when a large percentage of the sites become occupied by the di-positive and tri-positive ions. When this occurs, it is necessary to recharge or regenerate the resin bed by flushing it with a regenerant, typically a solution of sodium chloride or potassium chloride. The concentration of unipositive ions in the regenerant is sufficiently high to offset the unfavorable electrostatic competition and the binding sites are recovered by unipositive ions. The interval of time between regeneration periods during which water softening takes place is referred to as a service mode of operation.

Regeneration of water softeners is controlled by a valve arrangement that is automatically operated a motor through the standard regeneration cycle to flush, regenerate, and rinse the resin bed. A controller activates the motor based on the length of time since the previous regeneration, the amount of water that was treated, or the conductivity of the resin bed which indicates the remaining treatment capacity.

The valve arrangement is housed in a body with external connections for a water inlet, a water outlet, a regenerate reservoir, and a drain line. The body also includes a fitting to which the resin tank attaches. The external connections and the fitting communicate with a plurality of passages in the body that are selectively connected to one another by the operation of the valve arrangement. Heretofore, the valve body consisted of many different sections that were molded or machined separately before being fastened together to form the complete body. An example of one type of a prior valve assembly is described in U.S. Pat. No. 5,910,244. The complexity of the external connections and internal passages made reducing the number of valve body sections difficult without adding to the machining steps and thus the cost of the body.

Thus it is desirable to design a valve body in a way that reduces the number of parts, while facilitating casting the parts in a manner that eliminates subsequent machining.

SUMMARY OF THE INVENTION

A valve body, for a water treatment apparatus, is substantially formed by only a first part and a second part sealingly joined together to define a plurality of internal fluid chambers. The valve body has a primary exterior wall and a secondary exterior wall with a first, second, third and fourth exterior side walls extending between the primary and secondary exterior walls. The valve body further comprises a plurality of openings for an inlet valve element, an outlet valve element, a rinse valve element, a backwash valve element and a regenerant valve element that control flow of fluid through the valve body. The valve body also has a fluid fitting for connection to a water treatment vessel.

The first and second parts are joined at a seam that extends at an acute angle, and preferably diagonally, through the first and second exterior side walls. The first part comprises the secondary exterior wall and a section of each of the first and second exterior side walls, and further includes an untreated water inlet, a treated water outlet, a drain outlet, and a regenerant inlet. The second part comprises the primary exterior wall and another section of each of the first and second exterior side walls.

The configuration of the first and second parts enables the entire valve body, with all the necessary connections and openings for actuating valve elements, to be formed by only two parts which can be fabricated by conventional injection molding techniques.

DESCRIPTION OF THE OF THE DRAWINGS

DETAILED DESCRIPTION OF THE INVENTION

Figure 1:
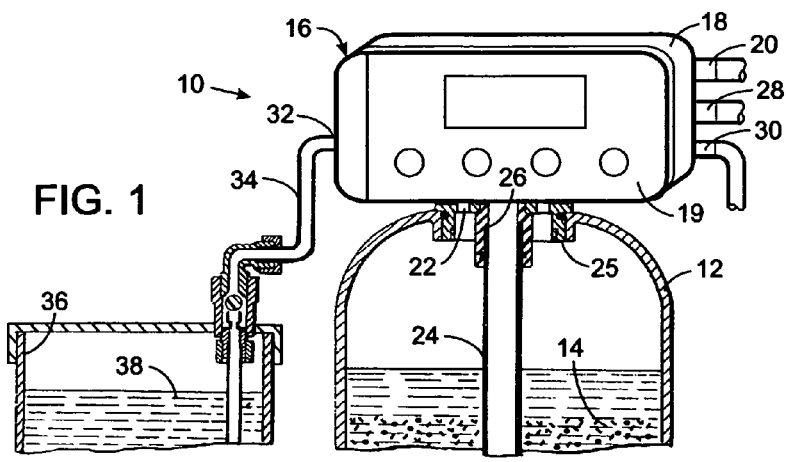
FIG. 1 is a partial cross sectional view illustrating components of a water softener that incorporates a valve body according to the present invention.

Referring initially to FIG. 1, a water softener 10 includes a treatment tank, or vessel 12, which contains a bed 14 of ion exchange resin particles. A control valve assembly 16, fixed to the top of the treatment vessel 12, includes a valve body 18 with a valve mechanism, described hereinafter, and a control panel 19 attached to the front of the valve body and containing an electrical circuit for operating the valve mechanism. In the service mode, hard water to be softened, supplied to an inlet coupling 20, flows through the valve body 18 to vessel inlets 22 in a fitting 25 at the top of the treatment vessel 12. That water passes through the resin bed 14 that removes minerals from the water. Water that has been treated in the resin bed 14 flows into a riser conduit 24 that extends through the bed from a point adjacent the bottom of the treatment vessel 12 to a vessel outlet 26 in the valve body 18. From the vessel outlet 26, the water continues through the valve body 18 from it exits the water softener 10 at a water outlet 28 connected to pipes in a building.

The resin bed 14 eventually becomes exhausted and no longer is capable of softening the water. Either periodically in response to a timer or in response to sensors detecting depletion of the resin bed, the control valve assembly 16 initiates a standard regeneration process, as described in the aforementioned U.S. patent. That process commences with a backwash step in which hard water is directed through the valve body 18 into the vessel outlet 26 and upwards through the resin bed 14 finally exiting the water softener via a drain coupling 30. The backwash step is followed by a brining step in which the controller draws a regenerant, commonly called "brine", through a regenerant connector 32 that is connected by a tube 34 to a brine tank 36. The brine tank 36 contains a regenerant solution 38 of a common salt, such as a sodium chloride or potassium chloride. In this stage of generation, a partial vacuum, created by the flow of hard water through valve body 18, draws the regenerant solution from the brine tank 36 and into the treatment vessel 12. The concentrated regenerant solution replaces the di-positive and tri-positive ions in the resin bed 14 with unipositive ions thereby recharging the bed.

During the final stage of the regeneration process, the brine tank 36 is refilled with water to replenish the regenerant solution for the next regeneration process. The resin bed 14 is rinsed by passing water through the vessel 12 and out the drain coupling 30. Thereafter, the control valve assembly 16 returns the internal valve arrangement to a state that places the water softener 10 into the previously described service mode in which the water for the building is treated.

Figure 2:
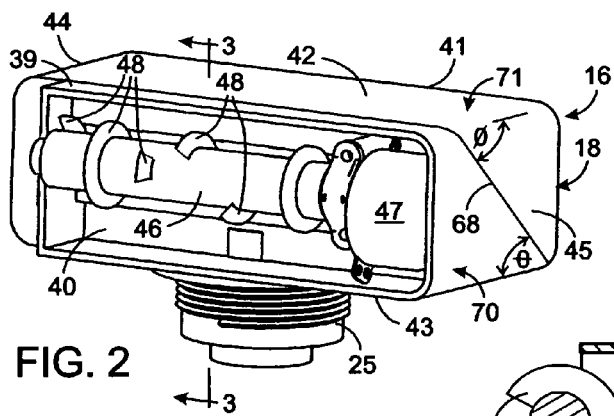
FIG. 2 is an isometric view of the front of the water softener control valve assembly with a cover removed.

FIG. 2 illustrates the control valve assembly 16 with the control panel 19 removed to show the front of the valve body 18 and valve actuating components attached thereto. The valve body 18 has a primary exterior wall 40, a secondary exterior wall 41, a first exterior side wall 44, a second exterior side wall 45, a third exterior side wall 42 at the top of the body, and a fourth exterior side wall 43 at the bottom of the body. A cam shaft 46 that is driven by an electric motor 47 is mounted to the primary exterior wall 40 and has a plurality of cams 48 thereon. As the cam shaft rotates, each cam operates a different flapper valve element within the valve body 18. For example with reference to FIG. 3, cam 48 engages the stem 49 of flapper valve element 114. That action pivots the flapper valve element 114 to open and close an aperture 100, thereby controlling fluid flow between chambers 84 and 76 within the valve body 18.

Figure 3:
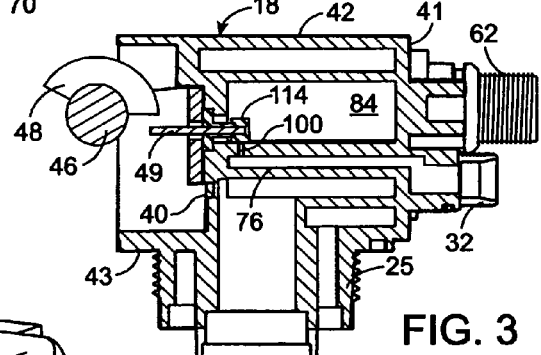
FIG. 3 is a cross section view through the control valve assembly along line 3-3 in FIG. 2.
Figure 4:
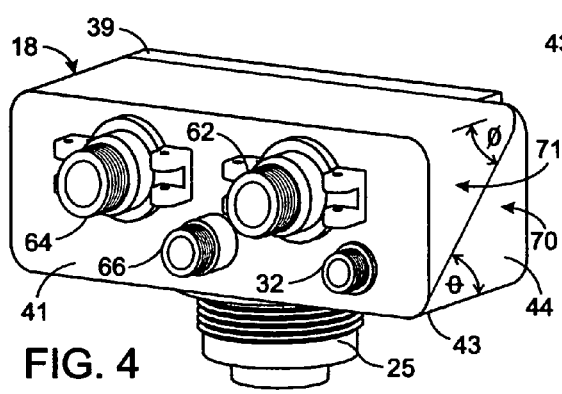
FIG. 4 is an isometric view of the rear of the control valve assembly showing the plumbing connectors.

Referring to FIG. 4, the secondary exterior wall 41 of the valve body 18 has a plurality of connectors through which fluid enters or exits the valve body. An untreated water inlet 62 is adapted to be connected to the supply pipe of the plumbing system for the building in which the water softener 10 is located and receives water for treatment by the water softener. After such treatment, water exits a treated water outlet 64 and returns to the building plumbing system. During regeneration, waste water exits the valve body 18 through a drain outlet 66 and flows to the waste water system of the building. The regenerant connector 32 also is located on the secondary exterior wall 41 of the valve body 18. As shown in FIGS. 2-4, the fitting 25 for connection to the treatment vessel 12 projects from the fourth exterior side wall 43 of the valve body 18 and has a threaded outer surface that engages threads on the opening of the treatment vessel.

Figure 5:
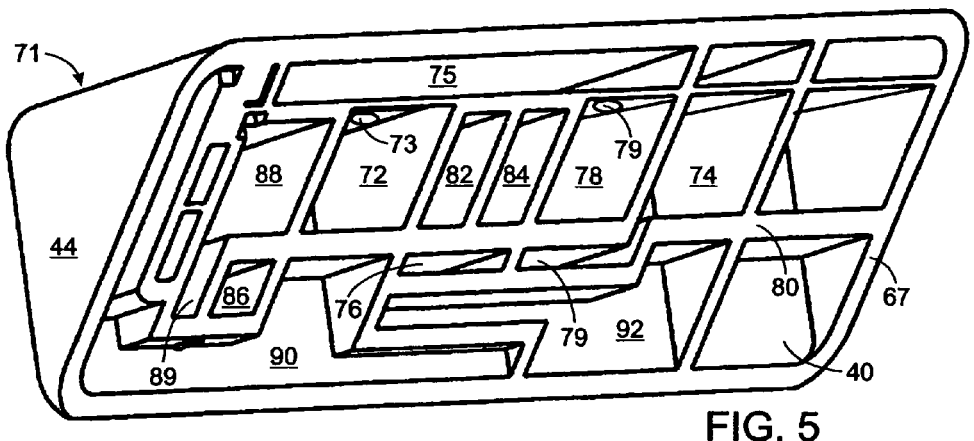
FIG. 5 is a isometric view of the rear part of the valve body of the control valve assembly.
Figure 6:
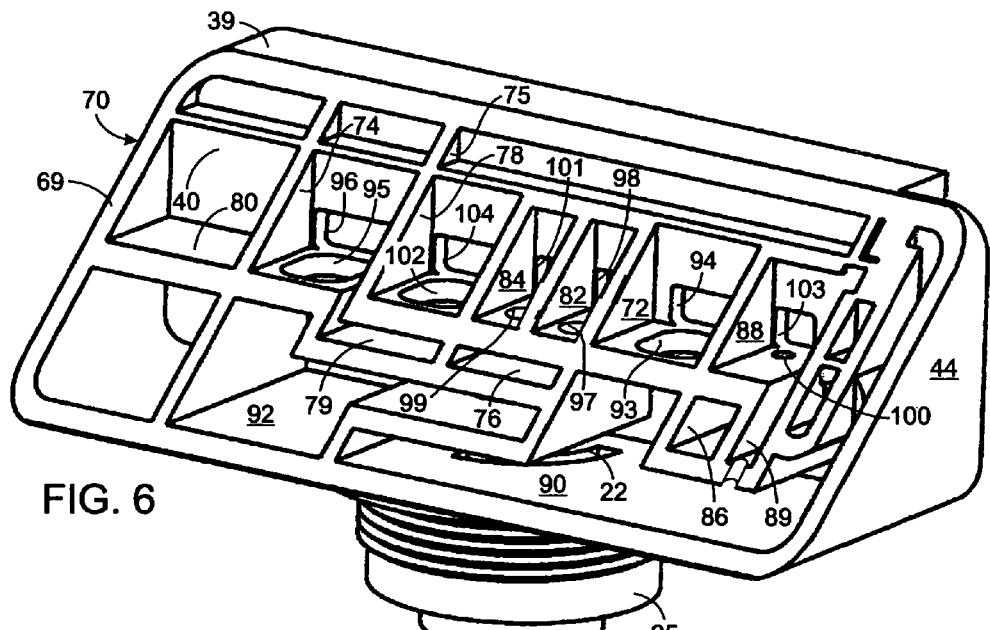
FIG. 6 is a isometric view of the front part of the valve body.

Referring to FIGS. 2 and 4, the valve body 18 is divided into a single piece first part 70 and a single piece second part 71 along a seam 68 that substantially diagonally bisects the first and second exterior side walls 44 and 45 so that a section of each exterior side wall is included on each part. The portions of the seam 68 in the first and second exterior side walls 44 and 45 extend at acute angles ($\phi$ and $\theta$) with respect to the third and fourth exterior side walls. The seam 68 extends across the front of the valve body proximate to a junction between the primary exterior wall 40 and the third exterior side wall 42. Thus substantially the entire third exterior side wall 42 is included in the second part 71, with the exception of a flange 39 around the cam shaft 46 and motor 47. The seam 68 further extends across the back of the valve body 18 proximate to a junction between the secondary exterior wall 41 and the fourth exterior side wall 43, so that the substantially the entire fourth exterior side wall is included in the first part 70. This division of the body produces first and second parts 70 and 71 that are generally a wedge-shaped pentahedron with triangular sides between which extend two perpendicular sides and one oblique open side 67 or 69, as shown in FIGS. 5 and 6. The first and second parts 70 and 71 of the valve body 18 are fitted together so that their respective oblique open sides 67 and 69 abut each other forming the seam 68. Those surfaces are either welded or cemented together to seal the interior walls of the body 18 thereby enclosing a plurality of internal chambers to be described.

As used herein, the statement that substantially the entire third exterior side wall is included in one part 70 or 71, and substantially the entire fourth exterior side wall is included in one part 71 or 70 allows for one or two relatively narrow strips of each such wall to be included in the other part, as long as such inclusion does not interfere with molding the internal walls and chambers of those parts. For example, the portion of the flange 39 that forms a section of the third exterior side wall 42 does not inhibit a mold component from exiting the open side 69 of the molded first part 70. For similar reasons, the seam 68 does not have to precisely bisect the first and second exterior side walls 44 and 45 of the valve body 18.

The interior of the second part 71 of the valve body 18 is shown in FIG. 5, and the untreated water inlet 62 opens into an inlet chamber 72 and the treated water outlet 64 opens into an outlet chamber 74. The inlet chamber 72 continuously opens through a first aperture 73 into a bridge passage 75 that opens through a second aperture 77 into a bypass chamber 78. The bypass chamber 78 is adjacent a branch passage 79 from the outlet chamber 74 separated therefrom by an interior wall 80 which extends almost the full width of the valve body 18. The inlet chamber 72, bypass chamber 78 and outlet chamber 74 are located on a first side of the interior wall 80. The outlet chamber branch passage 79 extends through the interior wall 80 to a second side to a location opposite the bypass chamber 78. A rinse chamber 82 and a backwash chamber 84 are located along side each other on the first side of the interior wall 80 between the inlet and bypass chambers 72 and 78.

The drain outlet 66 communicates with a drain chamber 76 on the second side of the interior wall 80 and opposite both the rinse and backwash chambers 82 and 84. The regenerant connector 32 opens into a regenerant chamber 86 that also is on the second side of the interior wall 80. A regenerant valve chamber 88 is on the first side of the interior wall 80 opposite to the regenerant chamber 86 and has a branch passage 89 that extends through the interior wall and opens into a vessel inlet chamber 90. The vessel inlet chamber 90 leads to the vessel inlets 22 in the fitting 25 for the treatment vessel 12 (see also FIGS. 1 and 6). The vessel outlet 26 projects upward through the interior of the fitting 25 and opens into a vessel outlet chamber 92 in the valve body.

Figure 7:
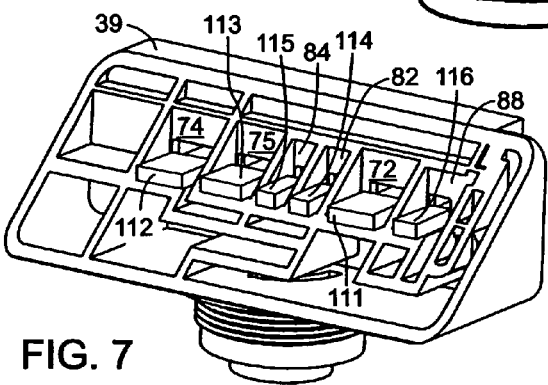
FIG. 7 is a isometric view of the front part of the valve body with flapper valve elements therein.

With reference to FIGS. 6 and 7, the first part 70 of the valve body 18, contains the primary exterior wall 40 with a plurality of valve openings for receiving the valve elements. The inlet chamber 72 has first valve opening 94 in the primary exterior wall 40 of the valve body into the inlet chamber 72 and receives an inlet flapper valve element 111. The inlet flapper valve element 111 selectively opens and closes a first valve aperture 93 through the interior wall 80 from the inlet chamber 72 to the vessel inlet chamber 90. The outlet chamber 74 has a second aperture 95 extending through the interior wall 80 into the vessel outlet chamber 92 and has a second opening 96 in the primary exterior wall 40 for receiving an outlet flapper valve element 112 that controls water flow through the second aperture. A third primary exterior wall opening 98 communicates with the rinse chamber 82 and holds the rinse flapper valve element 114 that selectively opens and closes a third aperture 97 leading into the drain chamber 76. The backwash chamber 84 has a fourth aperture 99 that also leads into the drain chamber 76 and the flow through which is controlled by a backwash flapper valve element 115 located in a fourth opening 101 in the primary exterior wall 40. The regenerant valve chamber 88 has an fifth aperture 100 through the interior wall 80 into the regenerant chamber 86. The fifth aperture 100 is opened and closed by a regenerant flapper valve element 113 held in a fifth opening 103 in the primary exterior wall. Finally, the he bypass chamber 78 has sixth aperture 102 through the interior wall 80 into the branch passage 79 from the outlet chamber 74. A sixth opening 104 through the primary exterior wall is provided for a bypass flapper valve element 113 the extends over the sixth aperture 102. Each of these flapper valve elements 111-116 is controlled by a different cam 48 of the cam shaft 46 on the front of the valve body shown in FIG. 2.

Each of the first and second parts 70 and 71 is formed from a single piece of material and the two parts joined together substantially entirely form the plurality of internal fluid chambers described above. As used herein, the term "substantially entirely form" means that the first and second parts contain all the walls of the internal fluid chambers, apertures between chambers, and exterior openings for components such as plumbing connections, valve elements, and venturi nozzles, for example. However, it should be understood that the first and second parts 70 and 71 may have one or more apertures that are closed by a plug.

By dividing the valve body 18 into two pieces along a diagonal seam 68, portions of each chamber are defined by each part 70 and 71 and those parts can be fabricated by conventional injection molding techniques. For example, the diagonal division allows two mold sections to come together along two orthogonal axes to form the different chambers and apertures in the valve body. An additional mold section moves perpendicular to the fourth exterior side wall 43 to form the vessel fitting 25 and the passages there through. Thus, the valve body 18 is able to be formed by only two pieces which entirely define the valve apertures, chambers and fluid passageways. Although the valve body 18 preferably consists of only two parts 70 and 71, other minor components, such as plugs for exterior or interior openings may be included, therefore the valve body 18 may consist essentially of only two parts.

Figure 8:
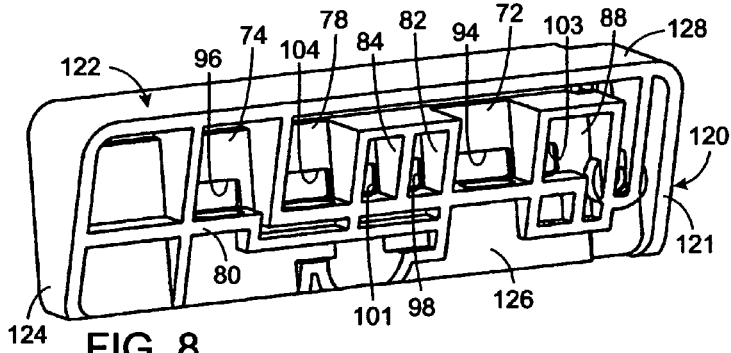
FIG. 8 is a isometric view of the front part of a second embodiment of the valve body.
Figure 9:
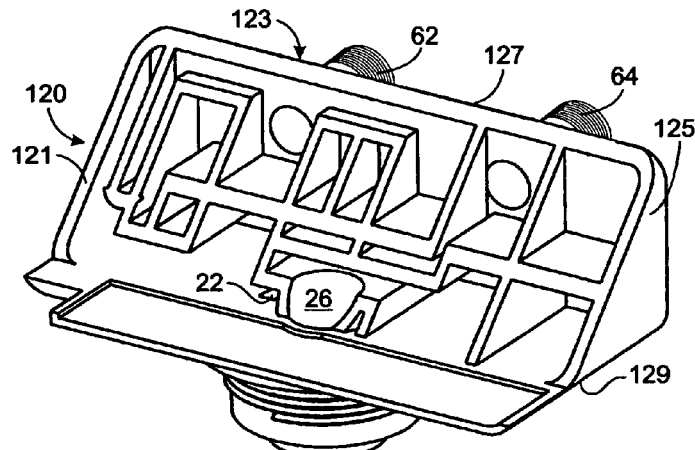
FIG. 9 is a isometric view of the rear part of the second embodiment.

In the embodiment just described, the valve body 18 is divided along a diagonal so that the first part 70 contains the primary exterior wall 40 and the treatment vessel fitting 25 while the second part 71 includes the secondary exterior wall 41 with the fluid connectors 62-66. Alternatively as shown in FIGS. 8 and 9, the valve body 120 is divided by a seam 121 that extends in the opposite diagonal orientation through the first and second exterior side walls 124 and 125 to define the first and second parts 122 and 123. That seam 121 extends across the front of the valve body proximate to a junction between the primary exterior wall 126 and the fourth exterior side wall 129, and across the back of the valve body 120 proximate to a junction between the secondary exterior wall 127 and the third exterior side wall 128. Thus, substantially the entire third exterior side wall 128 is included in the first part 122 and substantially the entire fourth exterior side wall 129 is included in the second part 123. The uniqueness and benefits of the two-part valve body are achieved, regardless of which way the diagonal seam runs.

Figure 10:
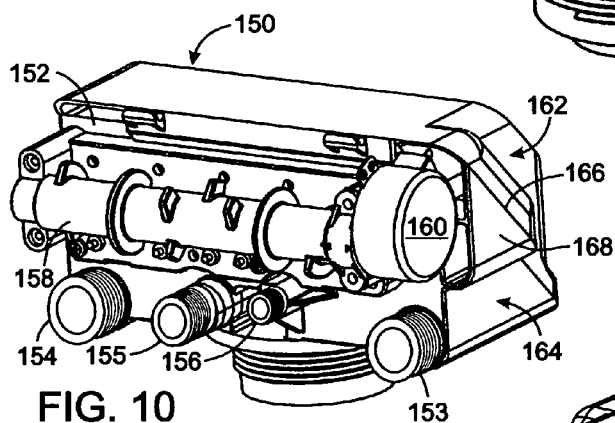
FIG. 10 is a isometric view from the rear of a third embodiment of a valve body according to the present invention.
Figure 11:
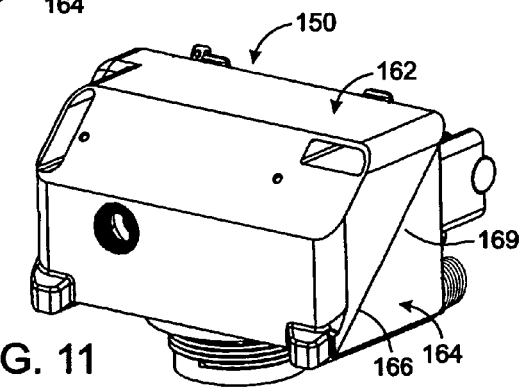
FIG. 11 is a isometric view from the front of the third valve body embodiment.

FIGS. 10 and 11 illustrate a third embodiment of a valve body 150, according to the present invention. In this version, the secondary exterior wall 152 of that valve body 150 contains the plumbing connections for the untreated water inlet 153, the treated water outlet 154, the drain outlet 155, and the regenerant inlet 156. In addition, the cam shaft 158 for operating the flapper valve elements and its drive motor 160 are mounted on the secondary exterior wall 152. In this case, the stems of the flapper valves protrude through openings in that secondary exterior wall 152 behind the cam shaft 158. The valve body 150 is divided into a front, or first, part 162 and a rear, or second, part 164 along a seam 166, which extends diagonally through each of the first and second exterior side walls 168 and 169 from the upper rear edge to the lower front edge of the body.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A valve body, for a water treatment apparatus, comprising:

a primary exterior wall and a secondary exterior wall, between which extend a first exterior side wall, a second exterior side wall and a third exterior side wall;

a fluid fitting for connection to a water treatment vessel;

the valve body having a seam which extends through the first exterior side wall and the second exterior side wall at acute angles to the third exterior side wall, thereby separating the valve body into a first part and a second part which abut each other to form a plurality of internal fluid passages;

the first part contains the secondary exterior wall that has an untreated water inlet, a treated water outlet, a drain outlet, and a regenerant connector; and the second part comprises the primary exterior wall through which extend a plurality of openings for receiving an inlet valve element, an outlet valve element, a rinse valve element, a backwash valve element and a regenerant valve element.

2. The valve body as recited in claim 1 wherein the fluid fitting is located in the first part.

3. The valve body as recited in claim 1 wherein the fluid fitting is located in the second part.

4. A valve body, for a water treatment apparatus, comprising:

a primary exterior wall and a secondary exterior wall, between which extend a first exterior side wall, a second exterior side wall and a third exterior side wall;

a fluid fitting for connection to a water treatment vessel;

the valve body having a seam which extends through the first exterior side wall and the second exterior side wall at acute angles to the third exterior side wall, thereby separating the valve body into a first part and a second part which abut each other to form a plurality of internal fluid passages;

the first part contains the secondary exterior wall that has an untreated water inlet, a treated water outlet, a drain connector, and a regenerant connector, and has a plurality of openings extending through the secondary exterior wall for receiving an inlet valve element, an outlet valve element, a rinse valve element, a backwash valve element and a regenerant valve element; and the second part comprises the primary exterior wall.

5. The control valve assembly as recited in claim 4 wherein the valve body further comprises another opening for receiving a bypass valve element.

\* \* \* \* \*

UNITED STATES PATENT AND TRADEMARK OFFICE
CERTIFICATE OF CORRECTION

PATENT NO. : 7,610,933 B2 Page 1 of 1
APPLICATION NO. : 11/349758
DATED : November 3, 2009
INVENTOR(S) : Honzelka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this

Twelfth Day of October, 2010

David J. Kappos
*Director of the United States Patent and Trademark Office*